United States Patent [19]
Bridge, Jr.

[11] 3,822,007
[45] July 2, 1974

[54] ARTICLE DISTRIBUTION APPARATUS

[76] Inventor: Edward W. Bridge, Jr., c/o Bridge Machine Co., Inc., Kennedy St., Palmyra, N.J. 08065

[22] Filed: May 29, 1973

[21] Appl. No.: 364,625

[52] U.S. Cl............................. 198/31 AC, 198/110
[51] Int. Cl............................................. B65g 47/26
[58] Field of Search.......... 198/86, 112, 31 AC, 110, 198/95, 124, 36

[56] References Cited
UNITED STATES PATENTS

| | | | |
|---|---|---|---|
| 1,507,301 | 9/1924 | Williams | 198/31 AC |
| 1,715,141 | 5/1929 | Mathieson | 198/203 |
| 2,633,224 | 3/1953 | Thebault | 198/31 AC |
| 2,848,100 | 8/1958 | Jasper | 198/124 X |

*Primary Examiner*—Evon C. Blunk
*Assistant Examiner*—Douglas D. Watts
*Attorney, Agent, or Firm*—Zachary T. Wobensmith, II; Zachary T. Wobensmith, III

[57] ABSTRACT

Apparatus is provided for distributing articles from a source of single articles, such as a meat patty forming machine, which includes a frame carrying a variable speed conveyor belt the delivery end of which is oscillated over a wider belt for delivering a plurality of the articles in spaced relationship for further operations such as packing, freezing, drying, or broiling.

3 Claims, 6 Drawing Figures

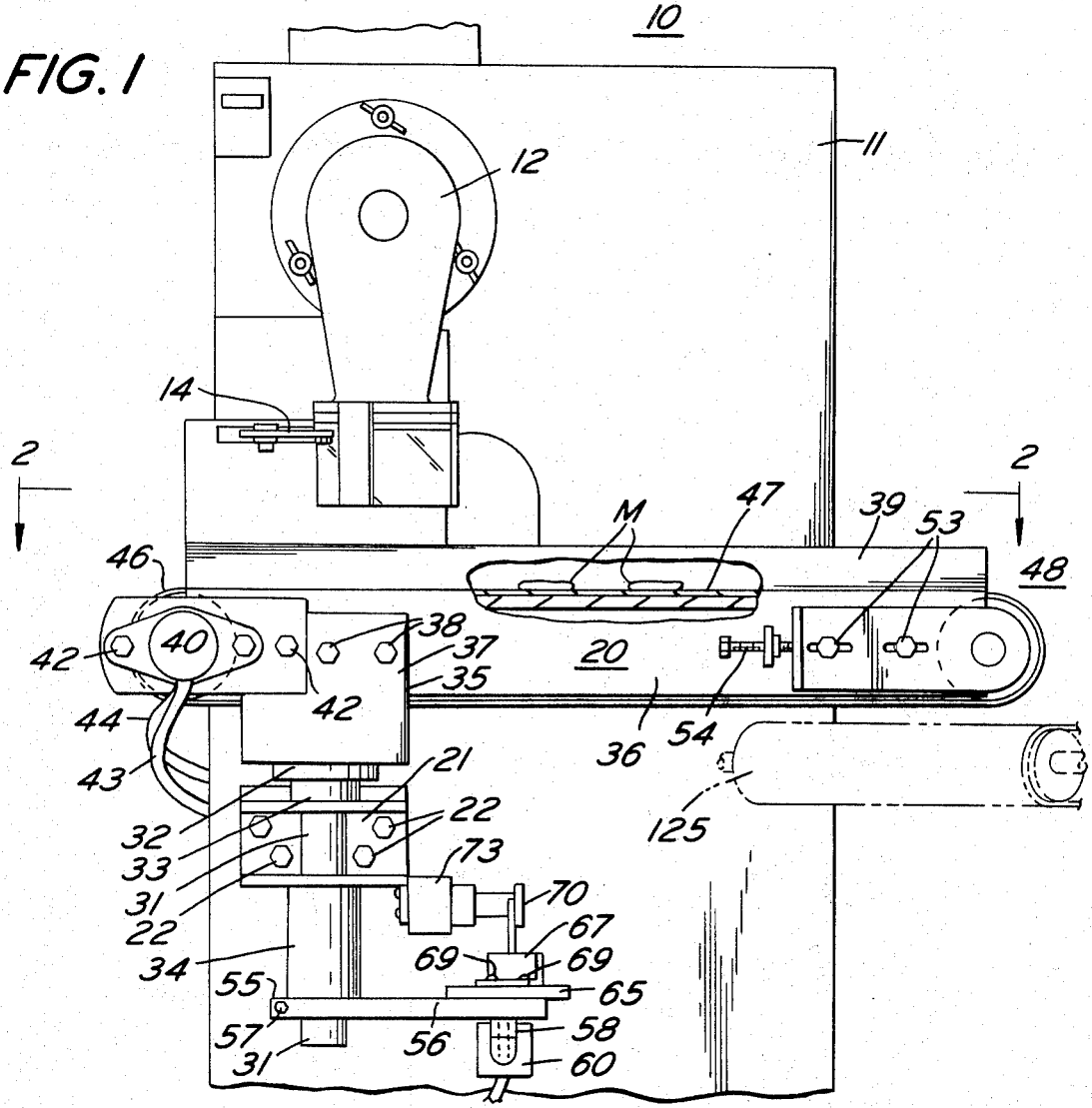

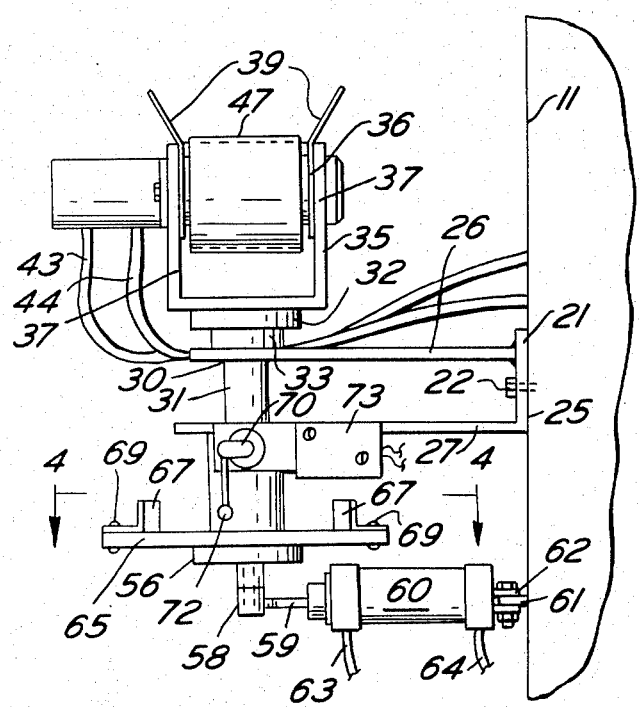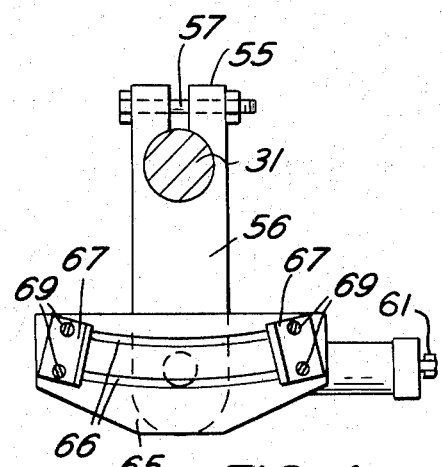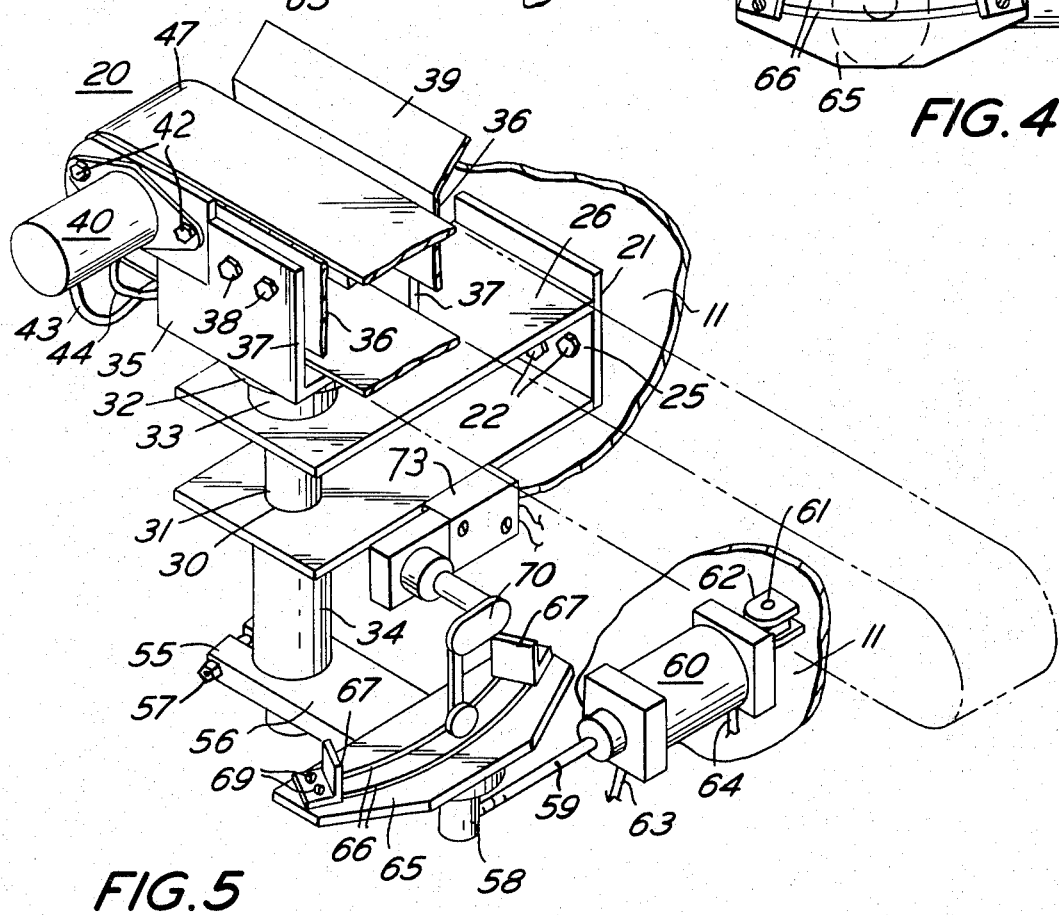

ARTICLE DISTRIBUTION APPARATUS

1. Field of the Invention

This invention relates to apparatus for delivering articles of the type wherein a moving conveyor belt the speed of which can be varied, has its delivery end oscillated in the horizontal plane for controlled delivery of articles placed thereon in spaced relation.

2. Description of the Prior Art

The horizontal positioning to a selected location of the discharge end of a conveyor belt has been in use for many years, and such positioning has been essential to ever wider use applications of conveyor apparatus. Such apparatus is shown in the U.S. Patents to Good U.S. Pat. No. 315,404, Twitchell et al. U.S. Pat. No. 3,046,848 and Jasper U.S. Pat. No. 2,848,100. The apparatus previously available was used to position the end of the conveyor when a change in the location of delivery was desired but was not suitable for operation in a timed sequence. The apparatus of my invention has a variable speed motor driving the conveyor belt and a variable speed of delivery end oscillation whereby articles of different sizes and shapes can be placed on the wider belt among items already thereon by varying the belt and oscillation speeds.

SUMMARY OF THE INVENTION

Article distribution apparatus is provided of the moving conveyor belt type wherein the delivery end of the belt is oscillated in a horizontal direction in synchronization with the belt speed with variable belt speed and delivery and oscillation for controlled distribution of articles on a wider conveyor belt placed below the delivery end of the oscillating belt.

The principal object of the invention is to provide article distributor apparatus that provides controlled spaced distribution of articles on a delivery belt.

A further object of the invention is to provide article distribution apparatus that can be used to carry a wide variety of articles as desired and according to its adjustment.

A further object of the invention is to provide article distribution apparatus that is fast and positive in its operation.

A further object of the invention is to provide article distribution apparatus that is dependable and requires little maintenance.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part thereof, in which:

FIG. 1 is a front elevational view of a preferred embodiment of the invention and illustrated in place on a meat patty forming machine;

FIG. 2 is a horizontal sectional view taken approximately on the line 2—2 of FIG. 1;

FIG. 3 is an end view taken from the right hand end of the apparatus of FIG. 1;

FIG. 4 is a horizontal sectional view taken approximately on the line 4—4 of FIG. 3;

FIG. 5 is a fragmentary perspective view, enlarged, of a portion of the apparatus of FIG. 1, parts being shown in phantom and broken away to show interior details.

Figure 6:
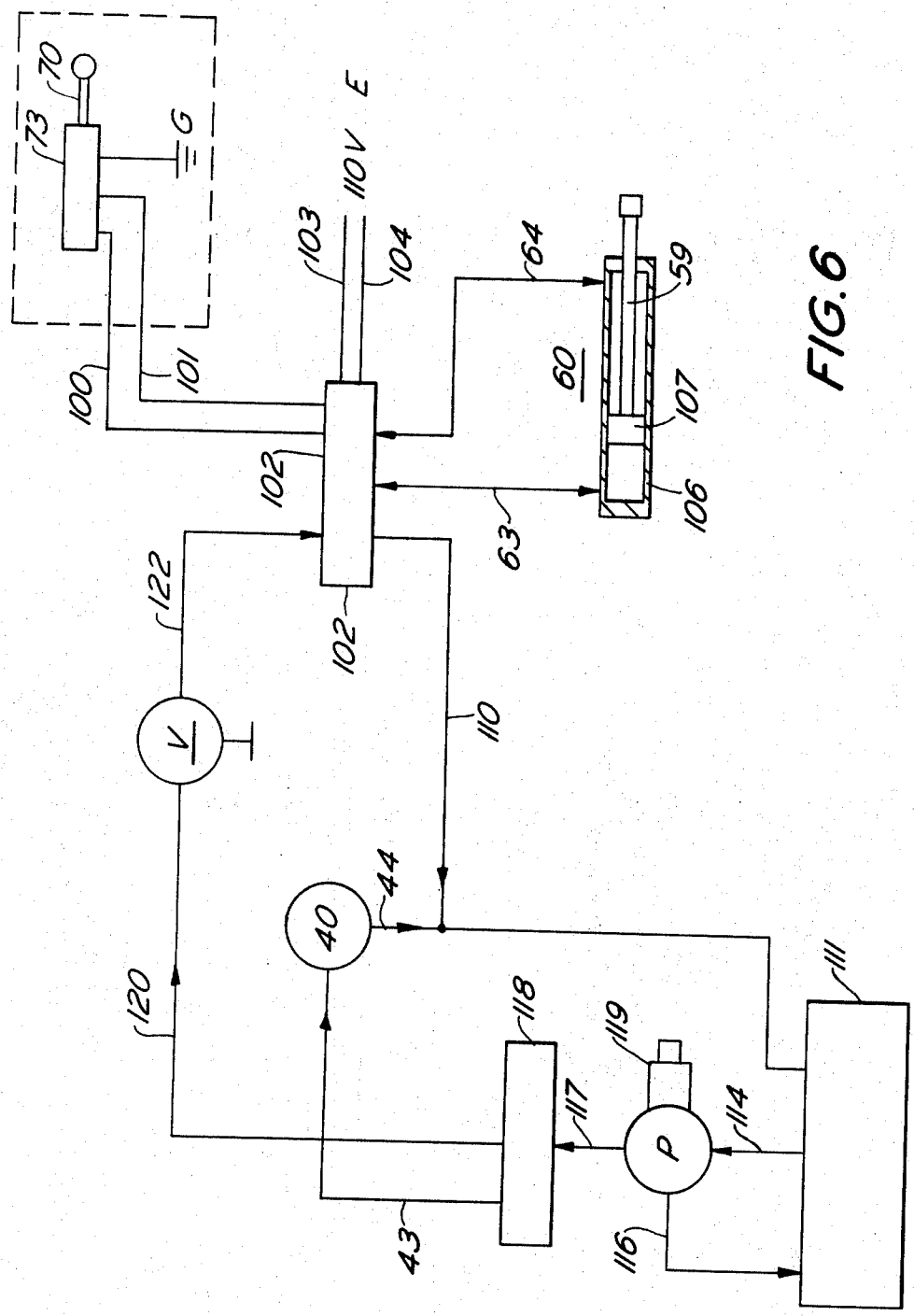
FIG. 6 is a diagrammatic view of the fluid and electrical circuitry of the article distribution apparatus of the invention.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings and FIGS. 1 to 5 thereof, the article distribution apparatus to be described is shown mounted on a meat patty forming machine 10 of well known type, having a front wall 11 and an output chute 12 from which meat patties M are successively discharged in accordance with the movement of a shutter 14 in a predetermined timed sequence. The distribution apparatus includes a frame 20 with a bracket 21 fastened to front wall 11 by bolts 22.

The bracket 21 consists of a rear plate 25 parallel and secured to the wall 11 by the bolts 22 and two forwardly extending spaced plates 26 and 27 perpendicular to and rigidly carried by plate 25.

The plates 26 and 27 have holes 30 therethrough through which a rotatable shaft 31 extends thereon with a bearing 32 on the shaft resting on a bearing 33 on the plate 26.

The shaft 31, above bearing 32 has a U-shaped supporting channel 35 secured thereto and with two longitudinally extending rectangular side plates 36 secured to the side plates 37 of the channel 35 by bolts 38.

The plates 36, above the channel 35, have angularly related flanged guide portions 39 which serve to guide the meat patties M, discharged from the machine to locations between the plates 36.

A driving motor 40 is provided secured to one of the plates 37 of the member 35 by bolts 42. The motor 40 is of the hydraulically operated type with supply and return pipes 43 and 44 extending to a source of fluid under pressure (not shown) for driving the motor 40 at the desired speed.

The driving motor 40 has a roller 46 driven thereby extending between plates 36 and engaged by an endless belt 47 which extends to the delivery end 48 of plates 36 where the belt 47 is carried by an idler roller 50 on shaft 51 mounted between the plates 36.

The shaft 51 is carried in side plates 52 adjustably mounted to plates 36 by bolts 53 with adjusting screws 54 for determining the adjustment of plates 52 and thereby the tension placed on the belt 47. The belt 47 is of well known type so as to be easy to clean and not affected by the materials which it carries.

The shaft 31 below the plate 27 has a spacer sleeve 34 thereon with a split end 55 of an arm 56 adjustably secured therebelow by a bolt 57. An actuator boss 58 pivotally carried on arm 56 which has a piston rod 59 from a piston 107 in cylinder 60 engaged therewith.

The cylinder 60, of the hydraulic type, is pivotedly mounted to a bracket 61 by pin 62 the bracket 61 being secured to the wall 11 by welding.

Supply pipes 63 and 64 extend to a source of fluid supply (not shown) under pressure to actuate the piston 107 and cause the rod 59 to move in and out of the cylinder 60.

The arm 56 has a plate 65 secured thereto above member 58 which has arcuate slots 66 therein. Limit stop plates 67 of L-shape are provided adjustably mounted to plate 65 by bolts 69 engaged in the slots 66 and movable therealong determining the positions of the stop plates 67.

A bell crank arm 70 has an end disc 72 positioned between the plates 67 and is attached to a limit switch 73 mounted on the bottom plate 27 of bracket 21.

The limit switch 73 is effective to cause the fluid supplied to the cylinder 60 to flow in one or the other of the lines 63 or 64 so that an oscillating motion is given to the arm 55, the extent of which is controlled by the limit stop plates 67 engaging the crank arm 70 and thereby the switch 73.

Referring now to FIG. 6, the circuitry for the apparatus is diagrammatically illustrated and includes the electrical limit switch 73 for reversal of electrical current direction, with attached bell crank arm 70, which switch is connected to a source of electrical energy E and to ground G.

Leads 100 and 101 extend to an electrically powered flow control valve 102 which has leads 103 and 104 extending to a source of electrical energy E.

The pipes 63 and 64 are connected to the flow control valve 102 and to the cylinder 60. The cylinder 60 has a piston 107 therein with the rod 59 connected thereto. Fluid pressure through pipe 63 or 64 will cause the piston 107 and rod 59 to move back and forth in the casing 105. The flow control valve 102 has a pipe 110 connected thereto and to a fluid supply reservoir 111. The reservoir 111 has a pipe 114 connected to it and to variable delivery pump P. The delivery from the pump P is adjustably controlled by a volume control valve 119. An overflow pipe 116 connects to the pump P and to the reservoir 111.

The valve P has a pipe 117 connected to it and to a manifold 118, which has the supply pipe 43 connecting it to the variable speed belt driving motor 40. The pipe 44 from motor 40 is connected to the pipe 110 for fluid return.

A pipe 120 connects the manifold 118 to a flow control valve V for balancing oscillation and the driving motor speed which valve V has a pipe 122 extending to the valve 102.

The mode of operation will now be pointed out.

The meat patty machine 10 is actuated so that meat patties M are discharged from the chute 12 and fall onto the belt 47. The motor 40 is activated and patties are carried along belt 47 to the right as seen in FIG. 1.

Fluid under pressure is supplied through pipes 63 or 64 to cause the piston rod 59 to move in and out of cylinder 60.

The movement of rod 59 through arm 55 causes the shaft 31 to rotate thereby moving the discharge end 48 of the frame 20 back and forth so that the patties M, are discharged to fall onto a moving belt 125 therebelow.

The arcuate movement of discharge end 48 causes the disc 72 of the switch arm 70 to be struck by one of the plates 67 which causes switch 73 to close and thereby flow of fluid is switched from pipe 43 to 44 and vice versa, when contact is made at the other plate 66 on the return, causing a controlled oscillation of end 48 and a spaced delivery of patties M onto belt 125.

The speed of motor 40 and the rate of oscillation are varied by adjustment of valves P or V as desired for delivery onto belt 135 where other articles may be already deposited.

The apparatus heretofore described is particularly suited for loading articles onto a continuously operating conveyor belt forming a part of other equipment such as deep fat fryers, batter and breading units, freezers, dryers, broilers, or ovens. The adjustability of the speed of the belt 47, and of the oscillation thereof, provides for varying the spacing or loading of the product as desired or required.

It will thus be seen that apparatus has been provided with which the objects of the invention are achieved.

I claim:

1. Article distribution apparatus which comprises
   a frame,
   a conveyor belt carried by said frame for receiving articles at one end thereof,
   a motor carried by said frame for driving said belt,
   pivotal mounting means for said frame contiguous to said one end of said belt,
   means for oscillating said frame about said mounting means for oscillation of the other end of said belt, and
   means for controlling said oscillating means,
   said means for oscillating said frame including a fluid operated reciprocating motor,
   said belt driving motor being fluid actuated,
   fluid pumping means being provided supplying fluid to both said motors, and
   fluid delivery control means being provided for said fluid pumping means.

2. Article distribution apparatus as defined in claim 1 in which
   said last means includes adjustably positioned limit members.

3. Article distribution apparatus as defined in claim 1 in which
   said last mentioned means includes a fixedly positioned control member and adjustably positioned limit members carried by said frame.

* * * * *